US008758191B2

(12) United States Patent
Takenaka et al.

(10) Patent No.: US 8,758,191 B2
(45) Date of Patent: *Jun. 24, 2014

(54) DRIVE UNIT

(75) Inventors: Toru Takenaka, Wako (JP); Hiroshi Gomi, Wako (JP); Shinichiro Kobashi, Wako (JP); Taiji Koyama, Wako (JP); Masao Sasaki, Wako (JP); Hideharu Izumi, Wako (JP); Kazuya Kuwabara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 485 days.

This patent is subject to a terminal disclaimer.

(21) Appl. No.: 12/882,468

(22) Filed: Sep. 15, 2010

(65) Prior Publication Data

US 2011/0070998 A1 Mar. 24, 2011

(30) Foreign Application Priority Data

Sep. 18, 2009 (JP) ................................ P2009-218172

(51) Int. Cl.
*F16H 13/08* (2006.01)
*B60B 19/12* (2006.01)
*B62K 1/00* (2006.01)

(52) U.S. Cl.
USPC .................. 476/68; 476/31; 476/72; 280/7.1

(58) Field of Classification Search
USPC ........... 476/16, 17, 27, 28, 31, 67, 68, 72, 73; 180/7.1, 15, 21, 209, 210, 218, 219; 280/293, 304; 301/5.23, 5.1
See application file for complete search history.

(56) References Cited

U.S. PATENT DOCUMENTS 3,746,117 A 7/1973 Alred
3,789,947 A * 2/1974 Blumrich ..................... 180/6.48
(Continued)

FOREIGN PATENT DOCUMENTS

JP 4-201793 A 7/1992
JP 3070015 B2 7/2000
(Continued)

OTHER PUBLICATIONS

JP Office Action, issued in JP 2009-278893, mailing date Jun. 25, 2013—English translation attached.
(Continued)

*Primary Examiner* — Troy Chambers
*Assistant Examiner* — Valentin Craciun
(74) *Attorney, Agent, or Firm* — Carrier Blackman & Associates, P.C.; Joseph P. Carrier; Jeffrey T. Gedeon

(57) ABSTRACT

A drive unit includes a main wheel having an annular member, and a plurality of driven rollers that are rotatably attached to the annular member, a plurality of first drive rollers and a plurality of second drive rollers, which are provided with the annular member between them and arranged such that they make contact with the outer peripheral faces of the driven rollers, a first holder and a second holder, which are arranged with the annular shaft between them and respectively hold the plurality of first drive rollers and the plurality of second drive rollers while allowing them to rotate, and a first drive unit and a second drive unit that rotationally drive the first holder and the second holder respectively; grooves are formed in the outer peripheral faces of the driven rollers at an angle to the circumferential direction thereof.

4 Claims, 10 Drawing Sheets

(56) References Cited

U.S. PATENT DOCUMENTS

| | | | | |
|---|---|---|---|---|
| 4,223,753 | A * | 9/1980 | Bradbury | 180/6.2 |
| 4,926,952 | A * | 5/1990 | Farnam | 180/6.5 |
| D309,254 | S * | 7/1990 | Guile | D8/375 |
| 5,323,867 | A * | 6/1994 | Griffin et al. | 180/22 |
| 6,343,667 | B2 | 2/2002 | Sauve | |
| 6,796,618 | B2 * | 9/2004 | Harris | 301/5.1 |
| 6,857,707 | B2 * | 2/2005 | Guile | 301/5.23 |
| 7,318,628 | B2 * | 1/2008 | Guile | 301/5.23 |
| 7,730,978 | B2 | 6/2010 | Dixon | 180/7.1 |
| 7,878,284 | B1 * | 2/2011 | Shultz | 180/199 |
| 7,980,336 | B2 * | 7/2011 | Takenaka et al. | 180/7.1 |
| 8,162,092 | B2 * | 4/2012 | Takenaka et al. | 180/222 |
| 8,220,571 | B2 * | 7/2012 | Gomi et al. | 180/21 |
| 8,240,407 | B2 * | 8/2012 | Takenaka et al. | 180/7.1 |
| 8,267,213 | B2 * | 9/2012 | Takenaka | 180/222 |
| 8,342,270 | B2 * | 1/2013 | Takenaka et al. | 180/7.1 |
| 8,353,378 | B2 * | 1/2013 | Gomi et al. | 180/218 |
| 8,356,681 | B2 * | 1/2013 | Gomi et al. | 180/21 |
| 8,386,159 | B2 * | 2/2013 | Takenaka et al. | 701/124 |
| 8,408,339 | B2 * | 4/2013 | Makino | 180/7.1 |
| 8,424,621 | B2 * | 4/2013 | Uehara | 180/7.1 |
| 8,428,788 | B2 * | 4/2013 | Takenaka et al. | 701/1 |
| 8,467,948 | B2 * | 6/2013 | Takenaka et al. | 701/70 |
| 8,499,863 | B2 * | 8/2013 | Takenaka et al. | 180/7.1 |
| 8,499,865 | B2 * | 8/2013 | Takenaka et al. | 180/21 |
| 8,556,279 | B2 * | 10/2013 | McKinnon | 280/47.27 |
| 8,567,535 | B2 * | 10/2013 | Takenaka et al. | 180/7.1 |
| 8,583,302 | B2 * | 11/2013 | Akimoto et al. | 701/22 |
| 8,640,807 | B2 * | 2/2014 | Takenaka | 180/218 |
| 2003/0034687 | A1 * | 2/2003 | Harris | 301/5.23 |
| 2004/0060759 | A1 * | 4/2004 | Hume | 180/218 |
| 2005/0183896 | A1 * | 8/2005 | Fenelli et al. | 180/65.3 |
| 2006/0249313 | A1 | 11/2006 | Kamen et al. | |
| 2007/0158117 | A1 | 7/2007 | Alexander | |
| 2008/0018167 | A1 * | 1/2008 | Fuji | 301/5.23 |
| 2008/0105471 | A1 | 5/2008 | Kamen et al. | |
| 2009/0288900 | A1 * | 11/2009 | Takenaka et al. | 180/218 |
| 2010/0038960 | A1 * | 2/2010 | Takenaka et al. | 305/133 |
| 2010/0096905 | A1 * | 4/2010 | Takenaka et al. | 301/5.23 |
| 2010/0139996 | A1 * | 6/2010 | Takenaka et al. | 180/20 |
| 2010/0270850 | A1 * | 10/2010 | Brudniok | 301/5.23 |
| 2011/0067937 | A1 * | 3/2011 | Gomi et al. | 180/21 |
| 2011/0067939 | A1 | 3/2011 | Takenaka | |
| 2011/0070997 | A1 * | 3/2011 | Gomi et al. | 476/66 |
| 2011/0071714 | A1 * | 3/2011 | Takenaka | 701/22 |
| 2011/0233989 | A1 * | 9/2011 | Takenaka et al. | 301/5.23 |
| 2011/0260523 | A1 * | 10/2011 | Takenaka et al. | 301/5.23 |
| 2012/0061156 | A1 * | 3/2012 | Takenaka et al. | 180/21 |

FOREIGN PATENT DOCUMENTS

| | | |
|---|---|---|
| JP | 3820239 B2 | 9/2006 |
| JP | 2008/139740 A1 | 11/2008 |
| WO | 2008/132778 A | 11/2008 |
| WO | 2008/132779 A | 11/2008 |
| WO | 2008/139740 A1 | 11/2008 |

OTHER PUBLICATIONS

US Office Action, issued in U.S. Appl. No. 12/633,300, issue date Jun. 9, 2011.

* cited by examiner

DRIVE UNIT

BACKGROUND OF THE INVENTION

1. Field of the Invention

The present invention relates to a drive unit. More specifically, it relates to a drive unit provided in an omnidirectional vehicle.

Priority is claimed on Japanese Patent Application No. 2009-218172 filed Sep. 18, 2009, the content of which is incorporated herein by reference.

2. Description of Related Art

An omnidirectional vehicle that can move omnidirectionally on a floor surface (i.e. in all directions within two dimensions) was proposed by the present applicants in, for example, International Publication No. 2008/132778 and International Publication No. 2008/132779. In the omnidirectional vehicles in International Publication Nos. 2008/132778 and 2008/132779, a ball-shaped, or wheel-shaped, or crawler-shaped main wheel that can move omnidirectionally on the floor surface while contacting the floor surface, and an actuator that includes an electric motor for driving the main wheel, and the like, are fitted to the base of a vehicle. The actuator drives the main wheel, whereby the vehicle moves on the floor surface.

The present applicants proposed a technology for controlling this type of operation for moving an omnidirectional vehicle in JPA No. 3070015. In this technology, the base of the vehicle can tilt to the front, rear, left, and right with respect to the main wheel. The tilt angle of the base is measured, and the torque of the electric motor that drives the main wheel is controlled such as to maintain the tilt angle at a required angle, thereby moving the vehicle in accordance with the tilting operation of the base.

FIG. 9 of International Publication No. 2008/132779 discloses a wheel having an annular shaft and a plurality of sleeves (hereinafter driven rollers) which are installed on the annular shaft in such a manner that they can rotate around the axis in the tangential direction of the annular shaft and make contact with an object for generating a driving force.

The main wheel configured in this manner rotates around the center axis of the annular shaft to move forward and backwards, and the driven rollers that are making contact with the ground rotate around the tangential direction of the annular shaft to move left and right.

When the main wheel described above moves forward and backwards, edges of the driven roller makes contact with the ground contact surface to obtain a gripping force of the main wheel. However, there is a possibility that the gripping force will decrease when the drive rollers revolve and the main wheel attempt to move in the lateral direction.

SUMMARY OF THE INVENTION

The present invention has been realized in view of these problems, and provides a drive unit that can increase gripping force when the main wheel moves in the lateral direction.

According to a first aspect of the present invention, a drive unit includes: a main wheel having an annular member, and a plurality of driven rollers that are rotatably attached to the annular member; a plurality of first drive rollers and a plurality of second drive rollers, which are provided with the annular member between them and arranged such that they make contact with the outer peripheral faces of the driven rollers; a first holder and a second holder, which are arranged with the annular member between them and respectively hold the plurality of first drive rollers and the plurality of second drive rollers while allowing them to rotate; and a first drive unit and a second drive unit that rotationally drive the first holder and the second holder respectively. Grooves are formed in the outer peripheral faces of the driven rollers at an angle to the circumferential direction thereof.

According to the first aspect of the invention, the rotation of the driven rollers around the tangential direction axis of the annular member makes the main wheel move in the lateral direction. By forming the grooves in the outer peripheral faces of the driven rollers at an angle to the circumferential direction thereof, it is possible to increase the frictional force between the driven rollers and the ground contact surface while the driven rollers rotate. Therefore, when the main wheel moves in the lateral direction, the gripping force between the main wheel and the ground contact surface can be increased, and the driving forces of the drive units can be efficiently transmitted.

According to a second aspect of the present invention, the grooves are arranged in a net formation such that the angle of the grooves becomes one whereby the outer peripheral faces of the driven rollers make contact with the outer peripheral faces of the first drive rollers and the second drive rollers.

According to the second aspect of the invention, by forming the grooves in a net formation such that their angle is one whereby the outer peripheral faces of the driven rollers make contact with the outer peripheral faces of the first drive rollers and the second drive rollers, frictional force between the driven rollers and the first and second drive rollers can be increased. Therefore, the gripping force between the driven rollers and the first and second drive rollers can be increased, and the driving forces of the drive units can be efficiently transmitted from the first and second drive rollers to the driven rollers.

According to a third aspect of the present invention, an interval between adjacent grooves is narrower than intervals between adjacent first drive rollers and between adjacent second drive rollers.

According to the third aspect of the invention, the grooves are formed such that the interval between adjacent grooves is narrower than the intervals between adjacent first drive rollers and between adjacent second drive rollers. Consequently, since the first holder (second holder) rotates with respect to any given driven roller, when there is intermittent contact between adjacent first drive rollers (second drive rollers), the first drive rollers (second drive rollers) always make contact with the grooves of the driven rollers. Therefore, the gripping force between the first and second drive rollers and the driven rollers can be more reliably increased, and the driving forces of the drive units can be transmitted efficiently from the first and second drive rollers to the driven rollers.

DETAILED DESCRIPTION OF THE INVENTION

Subsequently, an embodiment of the drive unit according to the present invention will be explained based on FIG. 1 to FIG. 12. In this embodiment, an omnidirectional vehicle which is an inverted pendulum type will be described.

Figure 1:
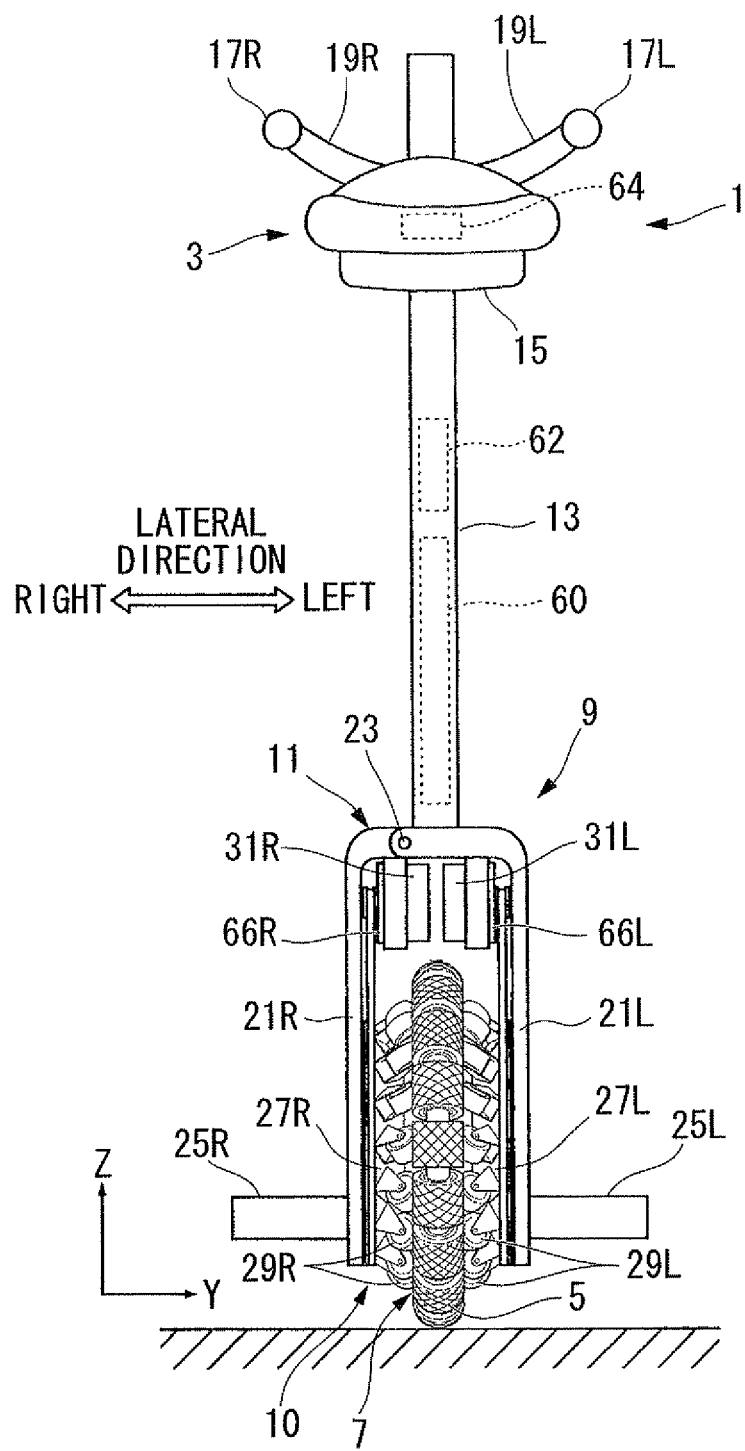
FIG. 1 is a front view of an omnidirectional vehicle according to an embodiment of the present invention.
Figure 2:
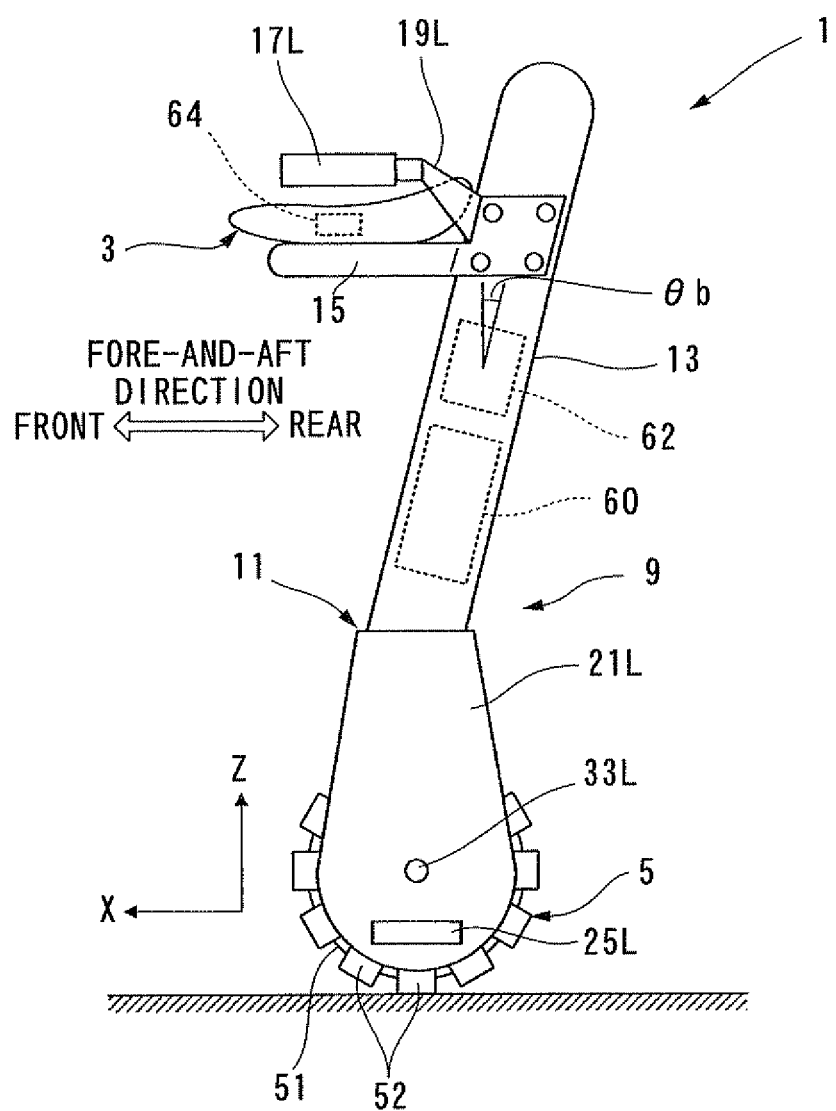
FIG. 2 is a side view of an omnidirectional vehicle according to an embodiment of the present invention.

As shown in FIG. 1 and FIG. 2, an omnidirectional vehicle 1 in this embodiment is a moving body which is an inverted pendulum type and including a payload supporting part 3 for a passenger who rides on the vehicle (operator), a main wheel 5 that can move on the floor surface omnidirectionally (in all directions within two dimensions, including the fore-and-aft direction and the lateral direction) while contacting the floor surface, an actuator 7 that applies power for driving the main wheel 5 to the main wheel 5, and a base 9 which the payload supporting part 3, the main wheel 5, and the actuator 7 are installed to. The main wheel 5 and the actuator 7 are constituted as a drive unit 10.

In the explanation of this embodiment, the directions of 'front-rear' and 'left-right' denote directions that respectively match or substantially match the fore-and-aft direction and the lateral direction of the upper body of a passenger riding with normal posture on the payload supporting part 3. 'Normal posture' denotes a posture envisaged in the design of the payload supporting part 3, in which the trunk axis of the passenger's upper body broadly faces in the top-bottom direction and his upper body is not twisted in any way.

In FIG. 1, the directions of 'front-rear' and 'left-right' respectively travel perpendicular to the paper and left-right within the paper. In FIG. 2, the directions of 'front-rear' and 'left-right' respectively travel to the left-right within the paper, and perpendicular to the paper. In the explanation of this embodiment, the letters 'R' and 'L' appended to the reference numerals respectively denote the right side and the left side of the omnidirectional vehicle 1.

The base 9 includes a lower frame 11 which the main wheel 5 and the actuator 7 are installed to, and a support frame 13 which extends upwards from the top end of the lower frame 11.

A seat frame 15 which projects from the support frame 13 to the front side is secured to a top part of the support frame 13. A seat 3, which the passenger sits on, is attached on the seat frame 15. In this embodiment, the seat 3 is a payload supporting part for the passenger. Therefore, the omnidirectional vehicle 1 (hereinafter simply vehicle 1) in this embodiment can move on the floor surface while the passenger is sitting on the seat 3.

Grips 17R and 17L, which the passenger who sits on the seat 3 grips when needed, are provided on the left and right of the seat 3. The grips 17R and 17L are secured to the tips of brackets 19R and 19L which extend from the support frame 13 (or the seat frame 15).

The lower frame 11 includes a pair of cover members 21R and 21L which face each other in a forked shape with a gap between them in the lateral direction. Top ends of the cover members 21R and 21L (the split portions of the fork) are joined via a hinge shaft 23 having an axis in the fore-and-aft direction, and one of the cover members 21R and 21L can swing around the hinge shaft 23 relative to the other. A spring (not shown) biases the cover members 21R and 21L in the narrowing direction of the bottom end sides of the cover members 21R and 21L (the tip sides of the fork).

A step 25R for supporting the right leg of the passenger seated in the seat 3 and a step 25L for supporting the left leg of the passenger project to the right and left of external parts of the cover members 21R and 21L respectively.

The main wheel 5 and the actuator 7 are arranged between the cover members 21R and 21L of the lower frame 11. The structures of the main wheel 5 and the actuator 7 will be explained.

Figure 3:
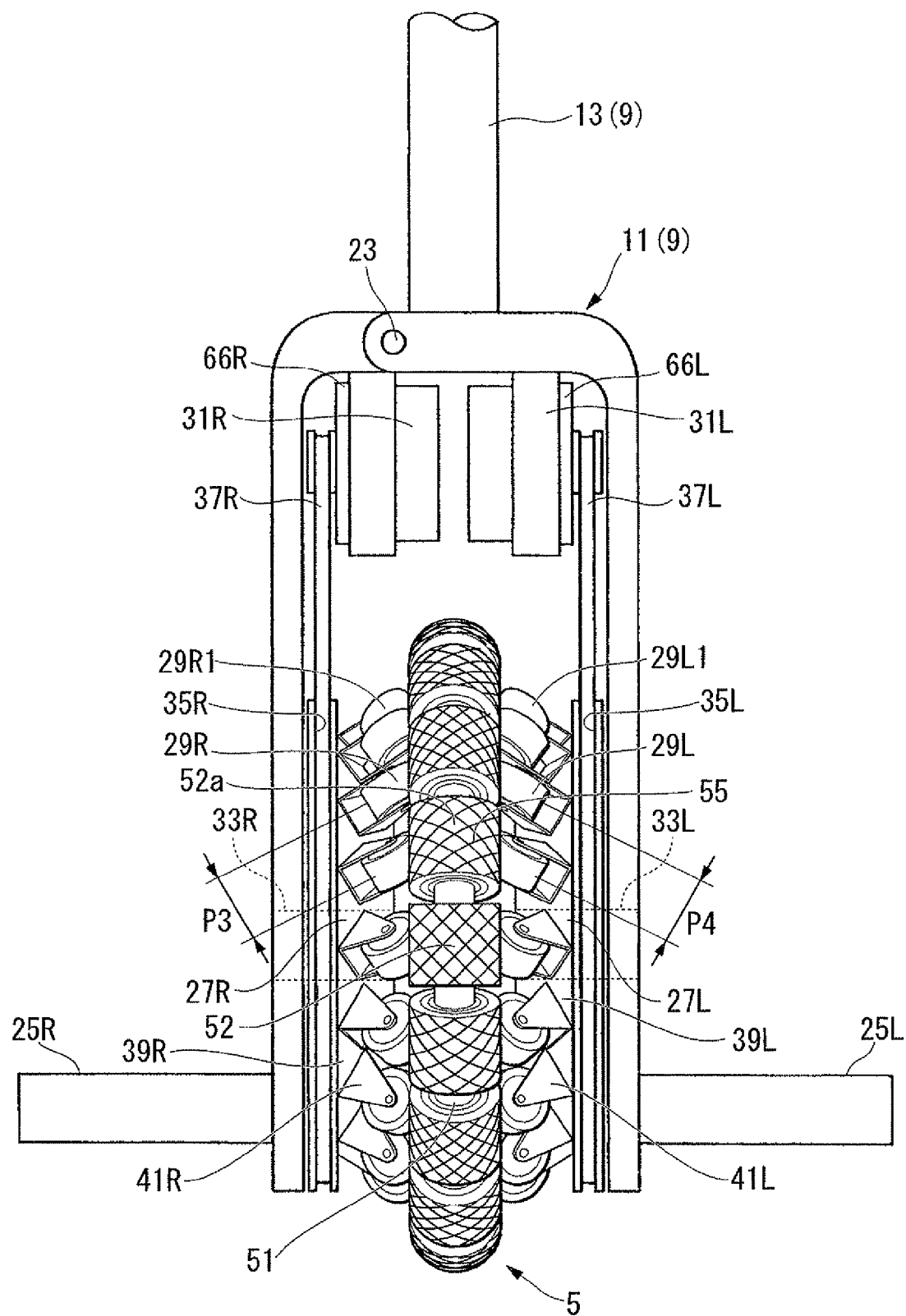
FIG. 3 is an enlarged front view of the bottom part of an omnidirectional vehicle according to an embodiment of the present invention.

As shown in FIG. 3, in this embodiment, the main wheel 5 includes an annular shaft 51 as the annular member, and a plurality of driven rollers 52 that are installed on the annular shaft 51 in such a manner that they can rotate around the axis in the tangential direction of the annular shaft 51 and make contact with an object for generating a driving force.

Figure 7:
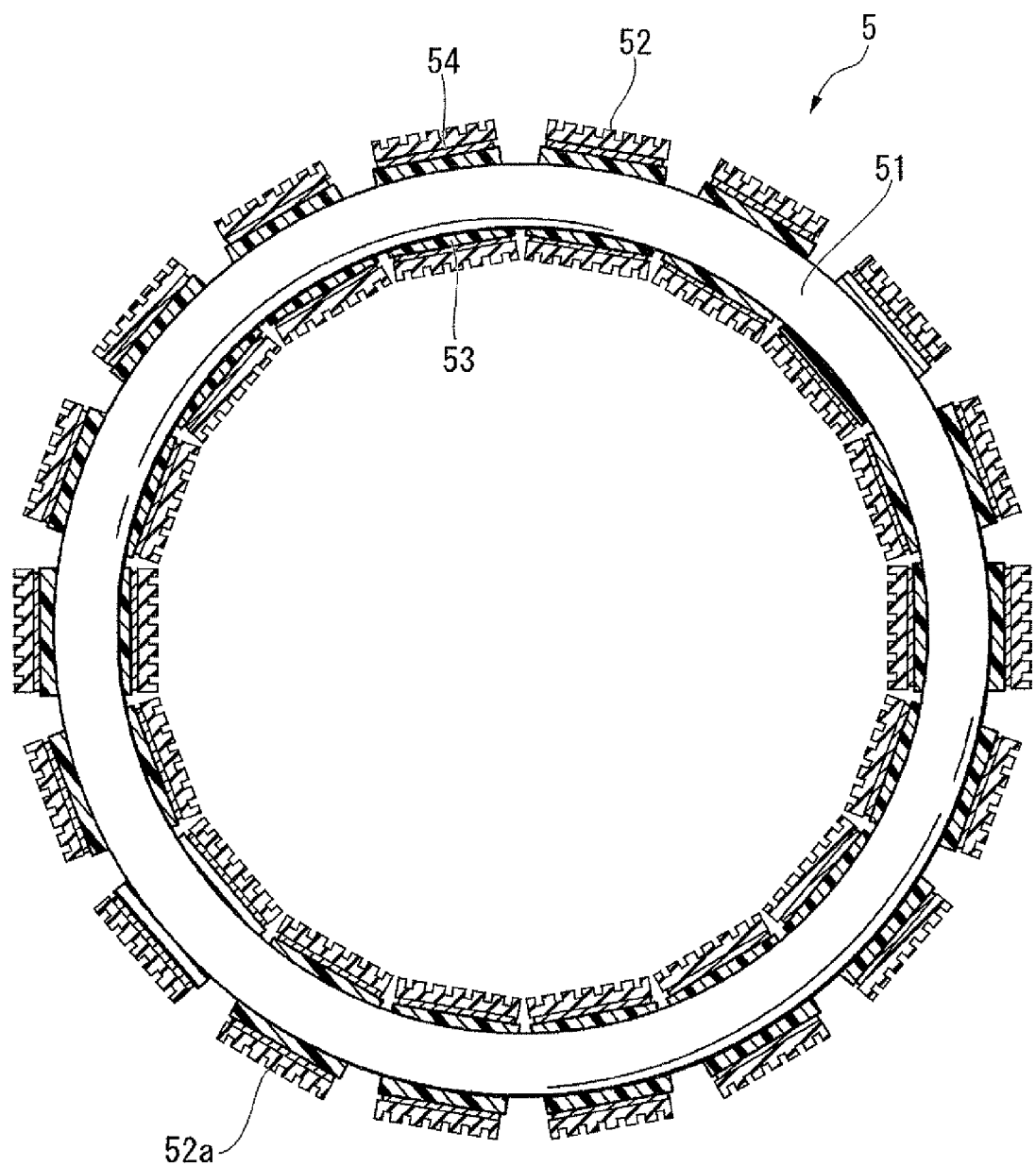
FIG. 7 is a cross-sectional view of a main wheel of an omnidirectional vehicle according to an embodiment of the present invention.

More specifically, as shown in FIG. 7, a great number of inner sleeves 53 are fitted to the annular shaft 51 in such a manner that they cannot rotate and cannot move in the circumferential direction. A driven roller 52, which a metal bearing 54 is integrally joined, is rotatably attached to each inner sleeve 53. The driven rollers 52 are free rollers that make contact with the object for generating a driving force. The driven rollers 52 are attached to the annular shaft 51 like beads of a rosary through which a string is passed, and each can rotate around the tangential axis of the annular shaft 51, i.e. around an axis line equivalent to a cross-sectional center line C1 (see FIG. 5). In other words, each driven roller 52 can rotate around its own center axis.

Figure 5:
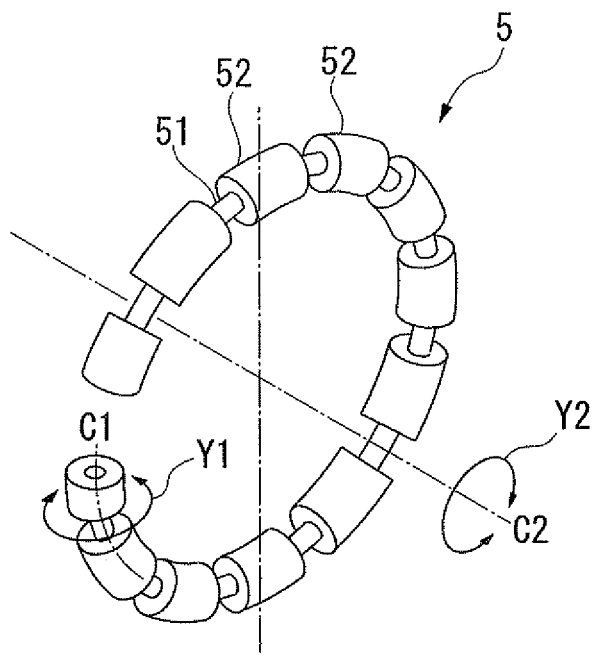
FIG. 5 is a perspective view of a main wheel of an omnidirectional vehicle according to an embodiment of the present invention.
Figure 6:
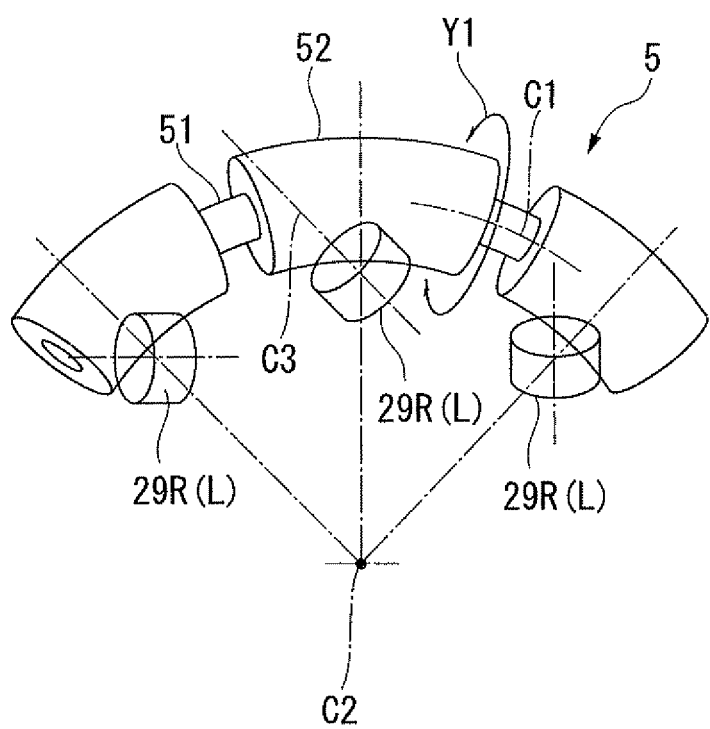
FIG. 6 is a diagram showing the deployment relationship of a main wheel and a free roller in an omnidirectional vehicle according to an embodiment of the present invention.

The cross-sectional center line C1 of the main wheel 5 connects the rotation axes of the driven rollers 52 in a ring shape, and, as indicated by arrow Y1 in FIG. 5 and FIG. 6, the main wheel 5 is made to rotate around the cross-sectional center line C1 by the rotation (revolution) of the driven rollers 52 themselves.

Figure 4:
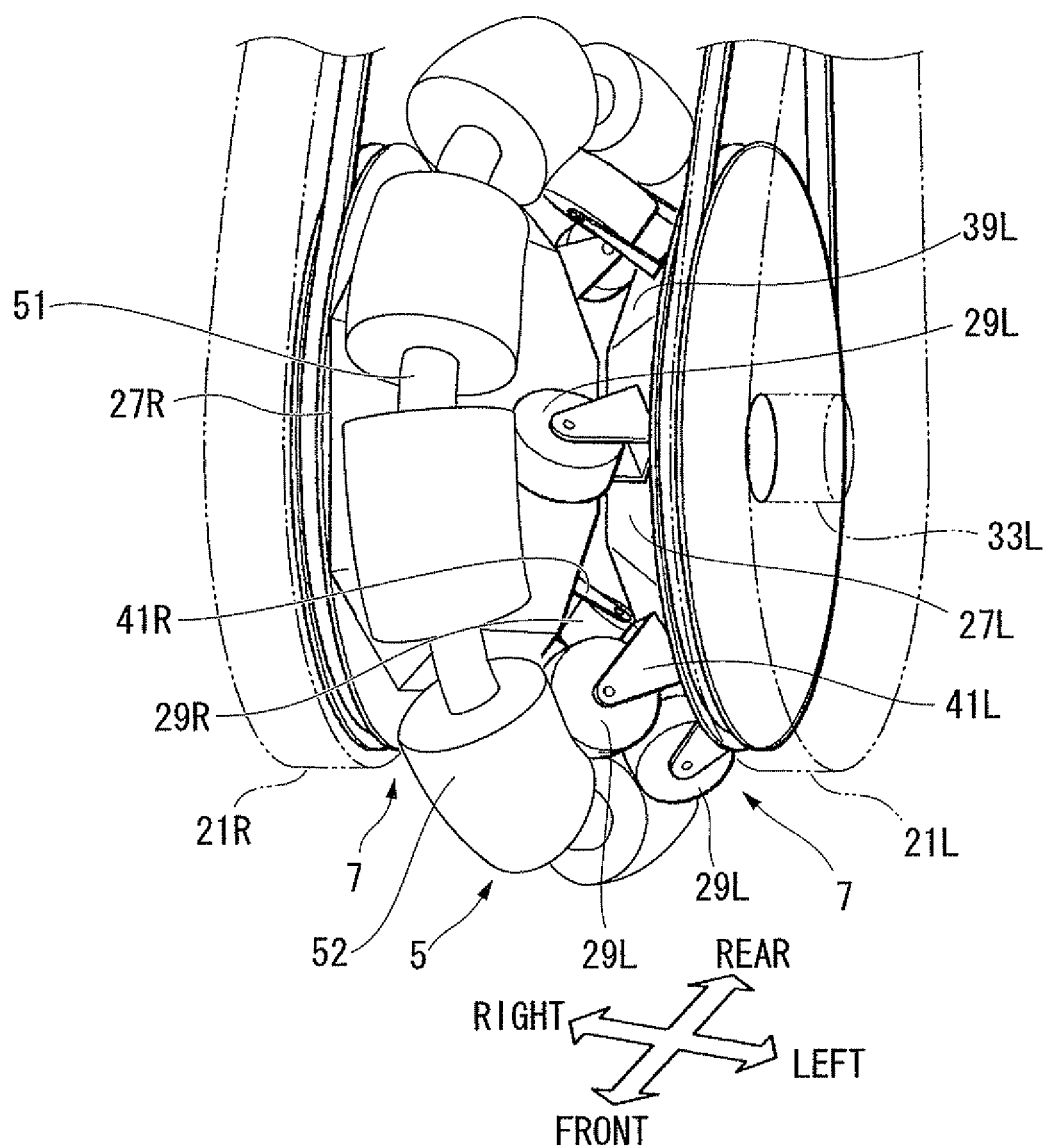
FIG. 4 is an enlarged perspective view of the bottom part of an omnidirectional vehicle according to an embodiment of the present invention.

As shown in FIGS. 3 and 4, in the main wheel 5, the driven rollers 52 rotate around the annular shaft 51 (around the cross-sectional center line C1) by making contact with free rollers 29R as the first drive roller and 29L as the second drive roller that rotate/move together with a rotation member 27R as the first holder and a rotation member 27L as the second holder, and can thereby apply a driving force in the lateral direction to the ground contact surface. The rotation member 27R as the first holder and the rotation member 27L as the second holder configure a carrier of drive roller. In addition, the circumferential direction movement of the annular shaft 51 resulting from the rotation of the entire main wheel 5 can apply a driving force in the fore-and-aft direction to the ground contact surface.

To prevent slipping due to a driving force always acting on the main wheel 5, the driven rollers 52 can be configured such that at least one free roller 29R and/or at least one free roller 29L are engaged with the driven rollers 52 at all times. In this embodiment, since the length of the movement direction of the rotation members 27R and 27L is always the same, this configuration can be achieved by appropriately determining the arrangement density of the free rollers 29R and 29L in the fore-and-aft direction of the vehicle 1 with respect to the driven rollers 52, and making the number of free rollers 29R and/or the number of free rollers 29L greater than the number of driven rollers 52.

Figure 8:
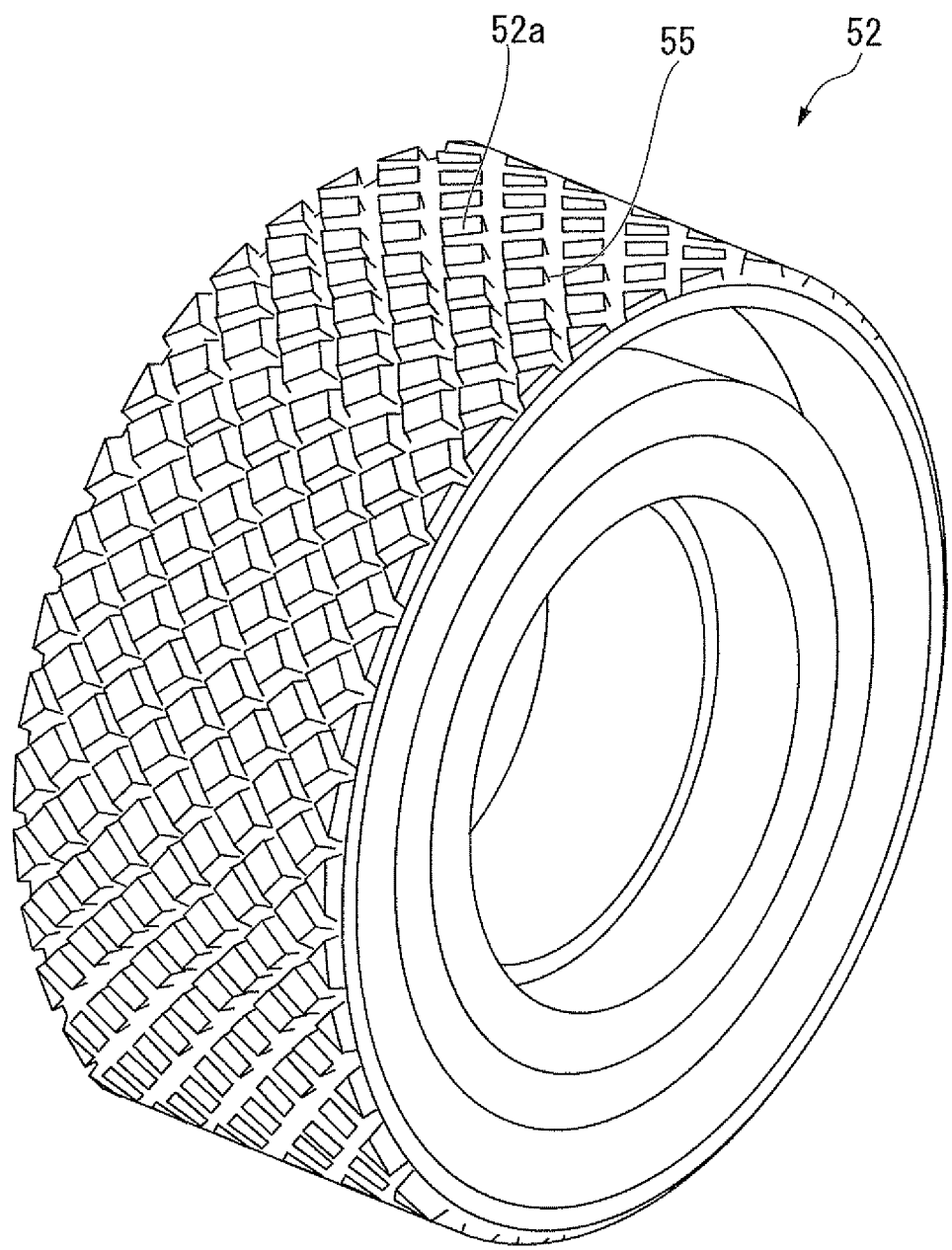
FIG. 8 is a perspective view of a driven roller of an omnidirectional vehicle according to an embodiment of the present invention.
Figure 9:
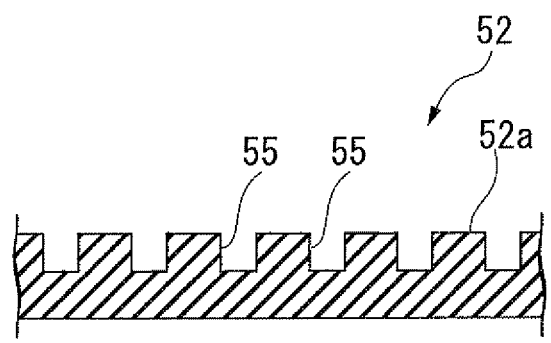
FIG. 9 is a cross-sectional view of the cross-sectional shape of a groove in a driven roller of an omnidirectional vehicle according to an embodiment of the present invention.
Figure 10:
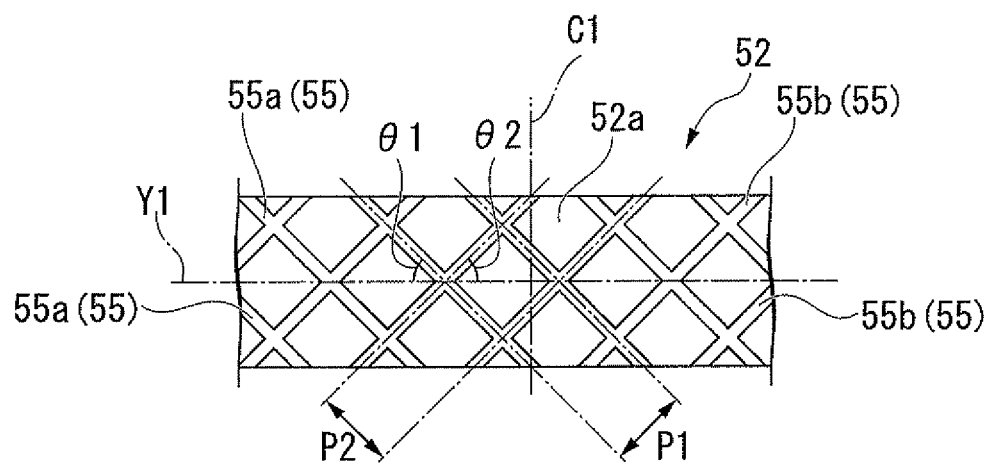
FIG. 10 is a plan view of the shape of a groove in a driven roller of an omnidirectional vehicle according to an embodiment of the present invention.

In this embodiment, grooves 55 are provided in the outer peripheral faces 52a of the driven rollers 52. As shown in FIGS. 8 and 9, the grooves 55 are, for example, rectangular in cross-section. As shown in FIG. 10, the grooves 55 are arranged in a net-like formation so as to obtain a predetermined angle with the circumferential direction Y1 of the outer peripheral faces 52a of the driven rollers 52.

Specifically, each groove 55 includes a groove 55a and a groove 55b. The groove 55a inclines from the circumferential direction Y1 by an angle θ1 formed where the outer peripheral face 52a of the driven roller 52 contacts the outer peripheral face 29R1 of the free roller 29R. The groove 55b inclines from the circumferential direction Y1 by an angle θ2 formed where the outer peripheral face 52a of the driven roller 52 contacts the outer peripheral face 29L1 of the free roller 29L. The angle θ1 formed where the outer peripheral face 52a of the driven roller 52 contacts the outer peripheral face 29R1 of the free roller 29R is the angle between the axis center of the driven roller 52 and the axis center of the free roller 29R when the driven roller 52 and the free roller 29R are in contact. The angle θ2 is defined similarly. The angles θ1 and θ2 are substantially the same, and are not zero. Specifically, this embodiment is configured such that the angles θ1 and θ2 are approximately 40° to 45°.

The pitch P1 between adjacent grooves 55a and 55a is narrower than the pitch P3 between adjacent free rollers 29R. Similarly, the pitch P2 between adjacent grooves 55b and 55b is narrower than the pitch P4 between adjacent free rollers 29L. Incidentally, the outer peripheral faces 52a of the driven rollers 52 are made from resin, rubber, or such like.

Furthermore, when the axis C2 of the main wheel 5 (the axis C2 orthogonal to the diameter direction of the entire main wheel 5) is faced in the lateral direction, the main wheel 5 is arranged between the cover members 21R and 21L, and the bottom end of the outer peripheral face of the main wheel 5 contacts the floor surface.

When driven by the actuator 7, the main wheel 5 can rotate around the axis C2 of the main wheel 5 (wheeling over the floor surface) as shown by the arrow Y2 in FIG. 5, and rotate around the cross-sectional center line C1 of the main wheel 5. By performing a composite operation of these rotations, the main wheel 5 can therefore move in all directions on the floor surface.

Returning back to FIGS. 3 and 4, the actuator 7 includes the rotation members 27R and free rollers 29R arranged between the main wheel 5 and the right-side cover member 21R, the rotation members 27L and free rollers 29L arranged between the main wheel 5 and the left-side cover member 21L, an electric motor 31R as a drive unit arranged above the rotation members 27R and the free rollers 29R, and an electric motor 31L as a drive unit arranged above the rotation members 27L and the free rollers 29L. The electric motor 31R constitutes the first drive unit, and the electric motor 31L constitutes the second drive unit in this embodiment.

Housings of the electric motors 31R and 31L are respectively attached to the cover members 21R and 21L. Power sources (capacitors) (not shown) for the electric motors 31R and 31L is mounted at a suitable place on the base 9, e.g. on the support frame 13.

The rotation members 27R are rotatably supported by the cover members 21R via a support axis 33R having an axis in the lateral direction. Similarly, the rotation members 27L are rotatably supported by the cover members 21L via a support axis 33L having an axis in the lateral direction. In this case, the rotation axis of the rotation members 27R (axis of the support axis 33R) and the rotation axis of the rotation members 27L (axis of the support axis 33L) are the same.

The rotation members 27R and 27L are respectively connected to the output axes of the electric motors 31R and 31L via power transmission mechanisms including a function of reducers, and are made to rotate by power (torque) transmitted respectively from the electric motors 31R and 31L. The power transmission mechanisms use, for example, a pulley and belt system. As shown in FIG. 3, the rotation member 27R is connected to the output axis of the electric motor 31R via a pulley 35R and a belt 37R. Similarly, the rotation member 27L is connected to the output axis of the electric motor 31L via a pulley 35L and a belt 37L.

The power transmission mechanisms can be formed from, for example, a sprocket and a link chain, or a plurality of gears. Furthermore, for example, it is acceptable if the electric motors 31R and 31L are arranged opposite the rotation members 27R and 27L such that their output axes are the same as the those of the rotation members 27R and 27L, and the output axes of the electric motors 31R and 31L are joined via the respective reducers (planetary gear devices) of the rotation members 27R and 27L.

The rotation members 27R and 27L are formed in the shape of truncated cones in which the diameter thereof decreases toward the main wheel 5, and their outer peripheral faces become tapered outer peripheral faces 39R and 39L.

A plurality of the free rollers 29R are provided around the tapered outer peripheral face 39R of the rotation member 27R in such a manner that they are arranged at substantially equal intervals on a circle concentric to the rotation member 27R. Each of the free rollers 29R is attached via a bracket 41R to the tapered outer peripheral face 39R, and is rotatably attached to the bracket 41R.

Similarly, a plurality of the free rollers 29L (the same number as the free rollers 29R) are provided around the tapered outer peripheral face 39L of the rotation member 27L in such a manner that they are arranged at roughly equal intervals on a circle concentric to the rotation member 27L. Each of the free rollers 29L is attached via a bracket 41L to the tapered outer peripheral face 39L, and is rotatably attached to the bracket 41L.

The main wheel 5 is sandwiched between the free rollers 29R on the rotation members 27R side and the free rollers 29L on the rotation members 27L side, and is arranged concentrically with the rotation members 27R and 27L.

In this case, as shown in FIG. 1 and FIG. 6, the axis C3 of each of the free rollers 29R and 29L tilts with respect to the axis C2 of the main wheel 5, and is also arranged in a tilted attitude with respect to the diameter direction of the main wheel 5 (the radial direction that joins the axis C2 to the free rollers 29R and 29L when the main wheel 5 is viewed from the direction of the axis C2). In this attitude, the outer peripheral faces 29R1 and 29L1 of the respective free rollers 29R and 29L are pressed in a diagonal direction at positions on the outer peripheral faces 52a of the driven rollers 52 corresponding to the inner peripheral face side of the main wheel 5.

More generally speaking, when the rotation members 27R are rotationally driven around the axis C2, the right-side free rollers 29R are pressed at the contact face of the right-side free rollers 29R contacting the main wheel 5 (driven rollers 52) at a position on the outer peripheral faces 52a of the driven rollers 52 corresponding to the inner peripheral face side of the main wheel 5 in an attitude that a frictional force component in the direction around the axis C2 (frictional force component in the tangential direction of the inner periphery of the main wheel 5) and a frictional force component in the direction around the cross-sectional center C1 of the main wheel 5 (frictional force component in the tangential direction of the circular cross-section) can be made to act on the main wheel 5 (driven rollers 52). The same goes for the left-side free rollers 29L.

As mentioned above, a spring (not shown) biases the cover members 21R and 21L in the narrowing direction of the bottom end sides of the cover members 21R and 21L (the tip sides of the fork). This biasing force sandwiches the main wheel 5 between the right-side free rollers 29R and the left-side free rollers 29L, and keeps the free rollers 29R and 29L pressed against the main wheel 5 (more specifically, it maintains a pressing state wherein frictional forces act between the free rollers 29R and 29L and the main wheel 5).

In the vehicle 1 having the structure described above, when the electric motors 31R and 31L respectively rotate the rotation members 27R and 27L in the same direction and at the same speed, the main wheel 5 rotates around the axis C2 in the same direction as the rotation members 27R and 27L. Consequently, the main wheel 5 wheels in the fore-and-aft direction, and the entire vehicle 1 moves in the fore-and-aft direction. In this case, the driven rollers 52 do not rotate around their cross-sectional center line C1.

When the rotation members 27R and 27L are rotationally driven in, for example, the reverse direction at the same speed, the driven rollers 52 rotate around their cross-sectional center line C1. The main wheel 5 consequently moves in the direction of its axis C2 (i.e. in the lateral direction), whereby the entire vehicle 1 moves in the lateral direction. Here too, the main wheel 5 does not rotate around its axis C2.

Moreover, when the rotation members 27R and 27L are rotationally driven in the same direction or the reverse direction at mutually different speeds (speeds including directions), the driven rollers 52 rotate around their cross-sectional center line C1 at the same time that the main wheel 5 rotates around its axis C2.

By a composite operation (synthetic operation) of these rotations, the main wheel 5 now moves in directions inclined to the fore-and-aft and lateral directions, whereby the entire vehicle 1 moves in the same direction as the main wheel 5. The movement direction of the main wheel 5 in this case changes depending on the difference in the rotation speed including the rotation direction of the rotation members 27R and 27L (a rotation speed vector whose polarity is defined in accordance with the rotation direction).

Since the movement of the main wheel 5 is performed in this manner, it is possible to control the rotation speeds (including the rotation directions) of the electric motors 31R and 31L, thereby controlling the rotation speeds of the rotation members 27R and 27L, and thereby to control the velocity and movement direction of the vehicle 1.

Subsequently, a configuration for controlling the operation of the vehicle 1 of this embodiment will be simply explained. The following explanation assumes an XYZ coordinates system such as that shown in FIGS. 1 and 2, where the X-axis represents a horizontal axis in the fore-and-aft direction, the Y-axis represents a horizontal axis in the lateral direction, and the Z-axis represents a perpendicular direction. The front-rear and lateral directions are sometimes termed the X-axis and Y-axis directions.

Firstly, a schematic operation control of the vehicle 1 will be explained. When, for example, a passenger seated in the seat 3 has tilted his upper body (specifically, when the passenger has tilted his upper body such as to move the position of the gravity point of the entire unit including the passenger and the vehicle 1 [a position projected onto a horizontal face]), the base 9 tilts with the seat 3 towards the side his body is tilted towards. At this time, the movement of the main wheel 5 is controlled such that the vehicle 1 moves to the side that the base 9 is tilted towards. For example, if the passenger tilts his upper body forwards, whereby the base 9 and the seat 3 also tilt forwards, the movement of the main wheel 5 is controlled such that the vehicle 1 moves forward.

That is, in this embodiment, the operation of tilting the base 9 is one of the basic steering operations of the vehicle 1 (an operating demand of the vehicle 1), and the movement of the main wheel 5 is controlled via the actuator 7 in accordance with this steering operation.

Here, the ground contact surface of the entire vehicle 1 of this embodiment, i.e. the ground contact surface of the main wheel 5, becomes a single local region with a smaller area than the region projected on the floor surface by the entire unit including the vehicle 1 and the passenger riding on it, and a floor reaction force acts only on that single local region. Therefore, to prevent the base 9 from tilting, the main wheel 5 must be moved such that the gravity point of the entire unit including the passenger and the vehicle 1 is almost directly above the ground contact surface of the main wheel 5.

Accordingly, in this embodiment, the movement of the main wheel 5 is basically controlled such that the actual attitude of the base 9 converges to a target attitude, wherein the target attitude for the base 9 is deemed to be one where the gravity point of the entire unit including the passenger and the vehicle 1 is almost directly above the center point (center point on the axis C2) of the main wheel 5 (more precisely, where the gravity point is almost directly above the ground contact surface of the main wheel 5).

During an operation such as starting the vehicle 1, when an additional external force acts upon the vehicle 1 in addition to the thrusting force of the actuator 7, for example, when the passenger kicks the floor with his feet as necessary to generate a thrusting force that increases the velocity of the vehicle 1 (thrusting force generated by frictional force between the floor and the soles of the passenger's feet), the movement of the main wheel 5 is controlled such that the velocity of the vehicle 1 (more precisely, the velocity of the gravity point of the entire unit including the passenger and the vehicle 1) increases accordingly. Incidentally, when this additional thrusting force ceases, the movement of the main wheel 5 is controlled (a brake control of the main wheel 5 is performed) such that the velocity of the vehicle 1 momentarily remains at a fixed speed, and thereafter decelerates until the vehicle 1 stops.

Moreover, when the passenger is not riding on the vehicle 1, the target attitude for the base 9 is deemed to be one where the gravity point of the unit including only the vehicle 1 is almost directly above the center point (center point on the axis C2) of the main wheel 5 (more precisely, where the gravity point is almost directly above the ground contact surface of the main wheel 5), and the movement of the main wheel 5 is basically controlled such that the actual attitude of the base 9 converges to the target attitude, thereby the vehicle 1 can be self-standing without tilting of the base 9.

As shown in FIGS. 1 and 2, to control the operation of the vehicle 1 in this way, a control unit 60 constituted from an electric circuit unit including a microcomputer, drive circuit units for the electric motors 31R and 31L, and such like, a tilt sensor 62 for measuring the tilt angle θb of a predetermined point on the base 9 with respect to the perpendicular direction (gravity direction) and its change speed (=dθb/dt), a load sensor 64 for detecting whether the passenger is riding on the vehicle 1, and rotary encoders 66R and 66L as angle sensors for detecting the rotation angles and the rotation angle speeds of the output axes of the electric motors 31R and 31L respectively, are mounted at appropriate points on the vehicle 1.

In this case, the control unit 60 and the tilt sensor 62 are, for example, attached to the support frame 13 of the base 9 in a state where they are accommodated inside the support frame 13. The load sensor 64 is built in the seat 3. The rotary encoders 66R and 66L are provided in a single unit with the electric motors 31R and 31L respectively. The rotary encoders 66R and 66L can be mounted on the rotation members 27R and 27L.

When the vehicle 1 of this configuration moves in the fore-and-aft direction, the main wheel 5 rotates around the axis C2 in the same direction as the rotation members 27R and 27L. At this time, due to the gap provided between adjacent driven rollers 52, a frictional force is generated between the ends (edges) of the driven rollers 52 and the ground contact surface, thereby generating an appropriate gripping force between the driven rollers 52 and the ground contact surface.

On the other hand, when the vehicle 1 of this configuration moves in the lateral direction, the driven rollers 52 rotate around their cross-sectional center line C1. At this time, while the driven rollers 52 contacting the ground contact surface rotate around their cross-sectional center line C1, due to the grooves 55 provided in the outer peripheral faces 52a of the driven rollers 52 in this embodiment, a frictional force is reliably generated between the driven rollers 52 and the ground contact surface. Therefore, an appropriate gripping force is generated between the driven rollers 52 and the ground contact surface.

According to this embodiment, the driven rollers 52 rotates around the tangential direction axis line C1 of the annular shaft 51, whereby the main wheel 5 moves in the lateral direction. Since the grooves 55 are formed in the outer peripheral face 52a of the driven rollers 52 at an angle to the circumferential direction Y1 thereof, the frictional force between the driven rollers 52 and the ground contact surface can be increased when the driven rollers 52 are rotating. Therefore, when the main wheel 5 moves in the lateral direction, the gripping force between the main wheel 5 and the ground contact surface can be increased, and the driving power of the electric motors 31R and 31L can be efficiently transmitted.

By arranging the grooves 55 in a net-like formation such that the angles θ1 and θ2 between the circumferential direction Y1 of the driven rollers 52 and the grooves 55 become the angle (θ1) where the outer peripheral faces 52a of the driven rollers 52 contact the outer peripheral faces 29R1 of free rollers 29R and the angle (θ2) where the outer peripheral faces 52a of the driven rollers 52 contact the outer peripheral faces 29L1 of free rollers 29L, the frictional force between the driven rollers 52 and the free rollers 29R and 29L can be increased. Therefore, the gripping force between the driven rollers 52 and the free rollers 29R and 29L can be increased, and the driving forces of the electric motors 31R and 31L can be transmitted efficiently from the free rollers 29R and 29L to the driven rollers 52.

Since the grooves 55 are formed such that the pitch P1 of adjacent grooves 55a and 55a and the pitch P2 of adjacent grooves 55b and 55b are respectively narrower than the pitch P3 of adjacent free rollers 29R and 29R and the pitch P4 of adjacent free rollers 29L and 29L, due to the fact that a rotation member 27R (27L) rotates with respect to any given driven roller 52, when there is intermittent contact between adjacent free rollers 29R and 29R (29L and 29L), the free roller 29R (29L) always makes contact with the groove 55 of the driven roller 52. Therefore, the gripping force between the free rollers 29R and 29L and the driven rollers 52 can be more reliably increased, and the driving forces of the electric motors 31R and 31L can be transmitted efficiently from the free rollers 29R and 29L to the driven rollers 52.

The foregoing embodiment is exemplary of the invention and is not to be considered as limitative, various modifications being possible without departing from the spirit or scope of the invention. The specific structure, shapes, and the like described in the embodiment are no more than examples, and can be modified as appropriate.

Figure 11:
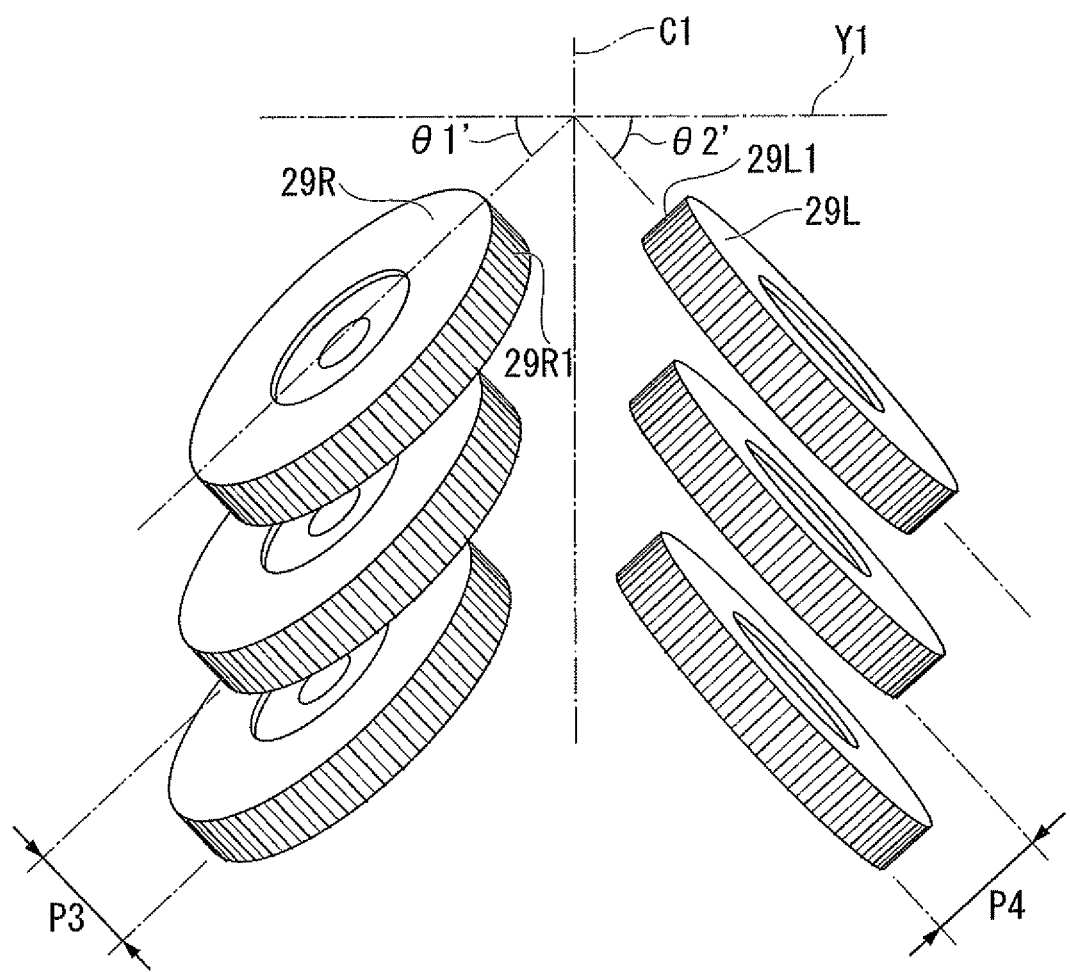
FIG. 11 is a perspective view of another aspect of free rollers of an omnidirectional vehicle according to an embodiment of the present invention.
Figure 12:
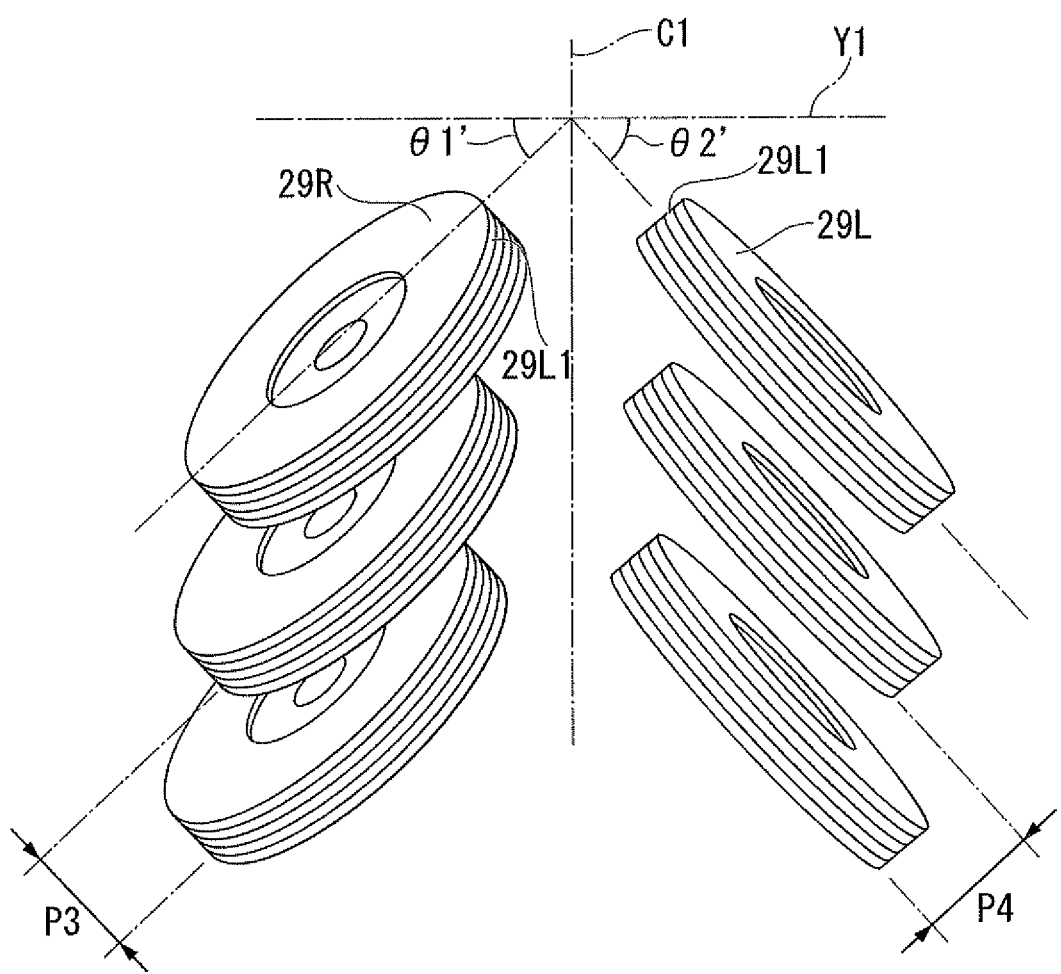
FIG. 12 is a perspective view of another aspect of free rollers of an omnidirectional vehicle according to an embodiment of the present invention.

For example, while the example of this embodiment describes a case where grooves are not provided in the outer peripheral faces of the free rollers, as shown in FIGS. 11 and 12, it is possible to provide horizontal grooves that are orthogonal to the circumferential direction of the free rollers 29R and 29L, and vertical grooves that are parallel to the circumferential direction of the free rollers 29R and 29L, in the outer peripheral faces 29R1 and 29L1 of the free rollers 29R and 29L. Likewise in this case, the pitch P1 between the grooves 55a and 55a in the driven rollers 52 is preferably narrower than the pitches P3 and P4 between adjacent free rollers 29R and 29R and adjacent free rollers 29L and 29L. Also, the angle (θ1') where the outer peripheral face 52a of the driven roller 52 makes contact with the outer peripheral face 29R1 of the free roller 29R, and the angle (θ2') where the outer peripheral face 52a of the driven roller 52 makes contact with the outer peripheral face 29L1 of the free roller 29L, are preferably the same as angles θ1 and θ2 mentioned above.

Furthermore, while this embodiment describes an example where the cross-sectional shape of the grooves in the driven rollers is rectangular, this is not limitative of the invention; for example, the grooves can have a trapezoidal cross-sectional shape.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A drive unit comprising:
   a main wheel having an annular member, and a plurality of driven rollers that are rotatably attached to the annular member;
   a plurality of first drive rollers and a plurality of second drive rollers, which are provided with the annular member between the plurality of first drive rollers and the plurality of second drive rollers and arranged such that they make contact with the outer peripheral faces of the driven rollers;
   a first holder and a second holder, which are arranged with the annular member between the first holder and the second holder and respectively hold the plurality of first drive rollers and the plurality of second drive rollers while allowing them to rotate;

and a first drive unit and a second drive unit that rotationally drive the first holder and the second holder respectively;

wherein grooves being formed in the outer peripheral faces of the driven rollers at an angle to the circumferential direction thereof.

2. The drive unit according to claim 1, wherein the grooves are arranged in a net formation such that the angle of the grooves becomes one where the outer peripheral faces of the driven rollers make contact with the outer peripheral faces of the first drive rollers and the second drive rollers.

3. The drive unit according to claim 1, wherein the interval between adjacent grooves is narrower than the intervals between adjacent first drive rollers and between adjacent second drive rollers.

4. The drive unit according to claim 2, wherein the interval between adjacent grooves is narrower than the intervals between adjacent first drive rollers and between adjacent second drive rollers.

\* \* \* \* \*